(12) United States Patent
Yeh

(10) Patent No.: US 7,676,109 B2
(45) Date of Patent: Mar. 9, 2010

(54) DEBLOCKING METHOD ACCORDING TO COMPUTING MODE DETERMINED FROM A FIRST VALUE AND A SECOND VALUE, THE SECOND VALUE DETERMINED ACCORDING TO PRECISELY EIGHT PIXELS

(75) Inventor: Jhy-Neng Yeh, Taoyuan County (TW)

(73) Assignee: Faraday Technology Corp., Hsin-Chu (TW)

( * ) Notice: Subject to any disclaimer, the term of this patent is extended or adjusted under 35 U.S.C. 154(b) by 629 days.

(21) Appl. No.: 11/423,716

(22) Filed: Jun. 13, 2006

(65) Prior Publication Data

US 2007/0286521 A1 Dec. 13, 2007

(51) Int. Cl.
*G06K 9/40* (2006.01)
*H04N 7/12* (2006.01)
*H04N 11/02* (2006.01)
*H04N 11/04* (2006.01)

(52) U.S. Cl. .................. 382/268; 382/261; 375/240.01; 375/240.02; 375/240.27; 375/240.29

(58) Field of Classification Search ................. 382/232, 382/233, 250, 275, 272, 266, 268
See application file for complete search history.

(56) References Cited

U.S. PATENT DOCUMENTS 6,240,135 B1 * 5/2001 Kim ...................... 375/240.01

* cited by examiner

*Primary Examiner*—Charles Kim
*Assistant Examiner*—Thomas A Conway
(74) *Attorney, Agent, or Firm*—Winston Hsu

(57) ABSTRACT

A deblocking method, for removing blocking artifacts comprises selecting a plurality of first pixels according to a bandwidth of a memory device, wherein the first pixels are uniformly distributed at two sides of a block boundary; calculating a first value according to the first pixels stored in the memory device; determining a computing mode according to the first value and a first predetermined value; generating a plurality of second pixels according to the first pixels and the computing mode; and replacing the first pixels stored in the memory device with the second pixels.

4 Claims, 4 Drawing Sheets

DEBLOCKING METHOD ACCORDING TO COMPUTING MODE DETERMINED FROM A FIRST VALUE AND A SECOND VALUE, THE SECOND VALUE DETERMINED ACCORDING TO PRECISELY EIGHT PIXELS

BACKGROUND OF THE INVENTION

1. Field of the Invention

The invention relates to multimedia processing device, and in particular to a method for removing blocking artifacts in block-based signals.

2. Description of the Related Art

Encoder and decoder are used for digital compression and decompression of multimedia data (e.g., according to Joint Photographic Experts Group (JPEG) or Moving Picture Expert Group (MPEG) industry standard data). However, when used at relatively low bit rates, the output of the decoder module produces noticeable coding artifacts, such as blockiness and ringing. Both types of artifacts are undesirable and caused by attenuation of high frequency terms. With blockiness artifacts, the boundaries of coded blocks are visible in slow-varying regions in image or video frames. Accordingly, there is a need to reduce blocking artifacts, particularly in MPEG encoded video streams, still-images, video conferencing applications, and other transform-based codecs.

It should be noted that the blocking artifacts appear at the block boundary between fixed block patterns in the form of a line of discontinuity, and removal of the blocking artifacts involves transformation of discontinuity to continuity in the block boundary region.

MPEG4 has defined a method for removing blocking artifacts in a coding system of a moving picture defined in ISO/IEC14996-2 F.3. The suggested number of pixels around a block boundary by MPEG4 is ten pixels (e.g., v0-v9). A mode decision value (e.g., eq_cnt) is calculated according to the following condition:

$$eq\_cnt = \phi(v0-v1) + \phi(v1-v2) + \phi(v2-v3) + \phi(v3-v4) + \phi(v4-v5) + \phi(v5-v6) + \phi(v6-v7) + \phi(v7-v8) + \phi(v8-v9)$$

where $\phi(r)=1$, if $|r| \leq THR1$, otherwise $\phi(r)=0$, and the THR1 is a first threshold value.

The mode decision value is used to determine whether to use the default mode or to use the DC offset mode for deblocking operations. The DC offset mode is selected if the mode decision value is greater than or equal to a second threshold value (e.g., THR2), otherwise the default mode is selected. When the default mode is selected, the deblocking operation is performed by replacing the magnitude of the discontinuous component of pixel $v_4$ and $v_5$ sandwiching the block boundary with $v_4'$ and $v_5'$, according to the following equation:

$$v_4' = v_4 - d$$

$$v_5' = v_5 + d$$

$$d = CLIP(c_2 \cdot (a_{3,0}' - a_{3,0}) / / c_3, (v_4 - v_5)2) * \delta(|a_{3,0}| < QP$$

$$a_{3,0}' = SIGN(a_{3,0}) * MIN(|a_{3,0}|, |a_{3,1}|, |a_{3,2}|))$$

$$a_{3,0} = ([c_1 - c_2 c_2 - c_1] * [v_3 v_4 v_5 v_6]^T) / / c_3$$

$$a_{3,1} = ([c_1 - c_2 c_2 - c_1] * [v_1 v_2 v_3 v_4]^T) / / c_3$$

$$a_{3,2} = ([c_1 - c_2 c_2 - c_1] * [v_5 v_6 v_7 v_8]^T) / / c_3$$

wherein QP is the quantization parameter of a macroblock where pixel $v_5$ belongs, values $c_1, c_2, c_3$ are kernel constants used in 4-point DCT, and $a_{3,0}, a_{3,1}, a_{3,2}$ are the discontinuous component in each of the plurality of pixel sets (S0, S1, S2), respectively.

When the DC offset mode is selected, the equation to remove the blocking artifacts is as follow:

$$\max = MAX(v_1, v_2, v_3, v_4, v_5, v_6, v_7, v_8),$$

$$\min = MIN(v_1, v_2, v_3, v_4, v_5, v_6, v_7, v_8),$$

$$\text{if } |\max - \min| < 2 \cdot QP,$$

$$\text{then } v_n' = \sum_{k=-4}^{4} b_k \cdot p_{n+k}, 1 \leq n \leq 8$$

$$p_m = \begin{cases} (|v_1 - v_0| < QP) ? v_0 : v_1, m < 1 \\ v_m, 1 \leq m \leq 8 \\ (|v_8 - v_9| < QP) ? v_9 : v_8, m > 8 \end{cases}$$

$$\{b_k: -4 \leq k \leq 4\} = \{1, 1, 2, 2, 4, 2, 2, 1, 1\} // 16$$

wherein the $v_0$-$v_9$ are boundary pixels, QP is the quantization parameter of a block adjacent the block boundary, and $v_n$ is an adjusted value. The equation $(|v1-v0|<QP)?v0:v1$ means $P_m = v0$ when $(|v1-v0|<QP)$, while $P_m = v1$ when $(|v1-v0| \geq QP)$. The equation $(|v8-v9|<QP)?v9:v8$ means $P_m = v9$ when $(|v8-v9|<QP)$, while $P_m = v8$ when $(|v8-v9| \geq QP)$.

The deblocking operation is performed by replacing $v_1$-$v_8$ with $v_1'$-$v_8'$. The blockiness artifact in the image or video frame will be removed after performing the deblocking operation through the default mode or DC offset mode.

Since ten pixels around the block boundary are taken into consideration, a 40 bit width is needed for a deblocking operation. In present systems with 32 bit bus/memory width, two memory accesses are required for a deblocking operation. Thus, the bandwidth request is increased.

BRIEF SUMMARY OF INVENTION

A detailed description is given in the following embodiments with reference to the accompanying drawings.

An embodiment of a deblocking method, for removing blocking artifacts comprises selecting a plurality of first pixels according to a bandwidth of a memory device, wherein the first pixels are uniformly distributed at two sides of a block boundary; calculating a first value according to the first pixels stored in the memory device; determining a computing mode according to the first value and a first predetermined value; generating a plurality of second pixels according to the first pixels and the computing mode; and replacing the first pixels stored in the memory device with the second pixels.

Another embodiment of a deblocking method for removing blocking artifacts, comprises selecting eight pixels, wherein the eight pixels are uniformly distributed at two sides of a boundary; calculating a first value according to the eight pixels; determining a computing mode according to the first value and a first predetermined value; generating a plurality of second pixels according to the eight pixels and the computing mode; and replacing the eight pixels with the second pixels.

In addition, another embodiment of a multimedia processing device comprises an encoder for encoding an input stream and outputting an encoded stream; decoder for decoding the encoded stream and outputting decoded stream; and a deblocking unit for selecting a plurality of first pixels from the decoded stream according to a bandwidth of a memory device, and generating a plurality of second pixels according to the first pixels and a computing mode for replacing the first pixels stored in the memory device to remove blocking artifacts.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
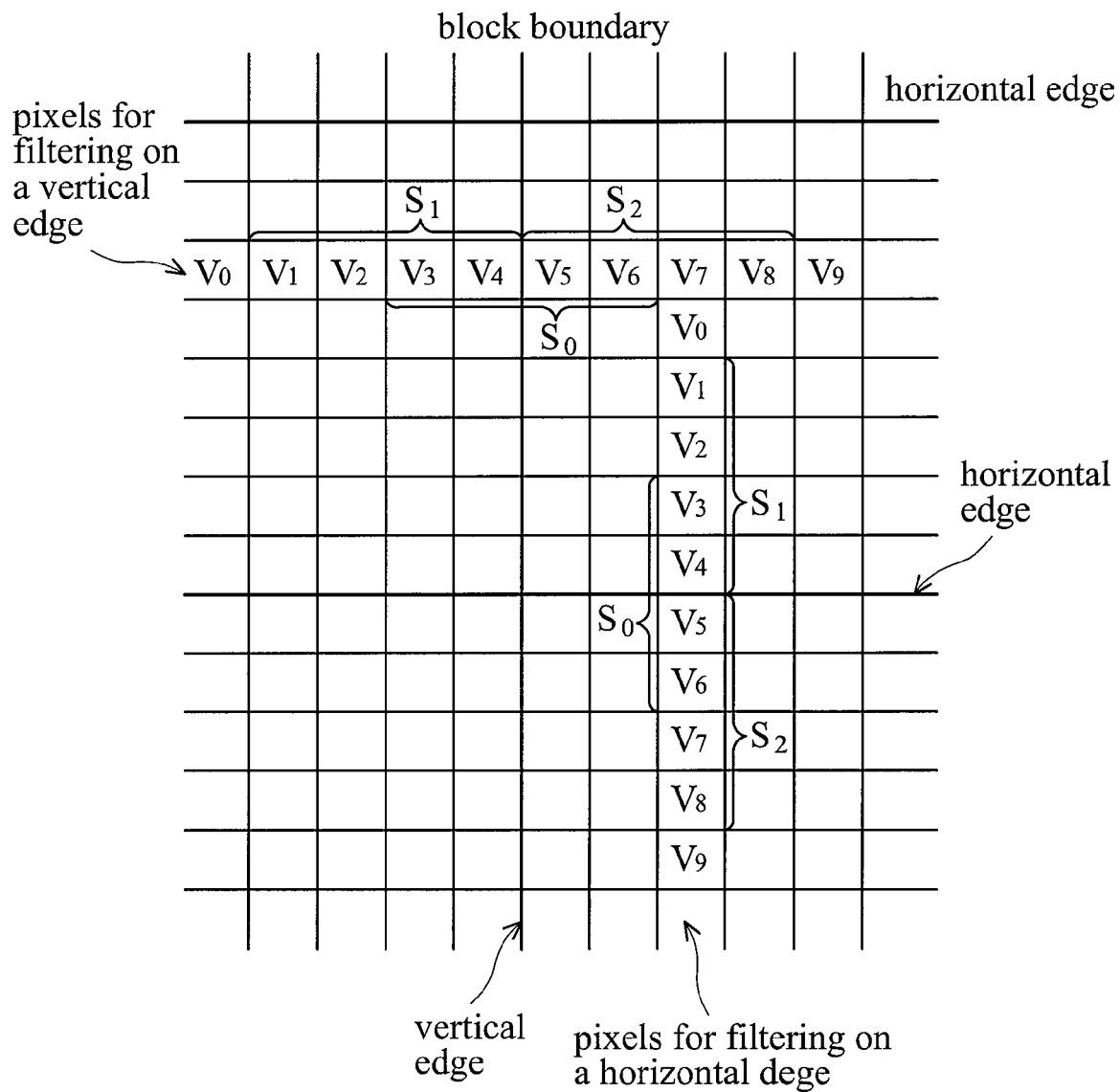
FIG. 1 is a schematic view of a pixel matrix illustrating block boundaries in horizontal and vertical directions.
Figure 2:
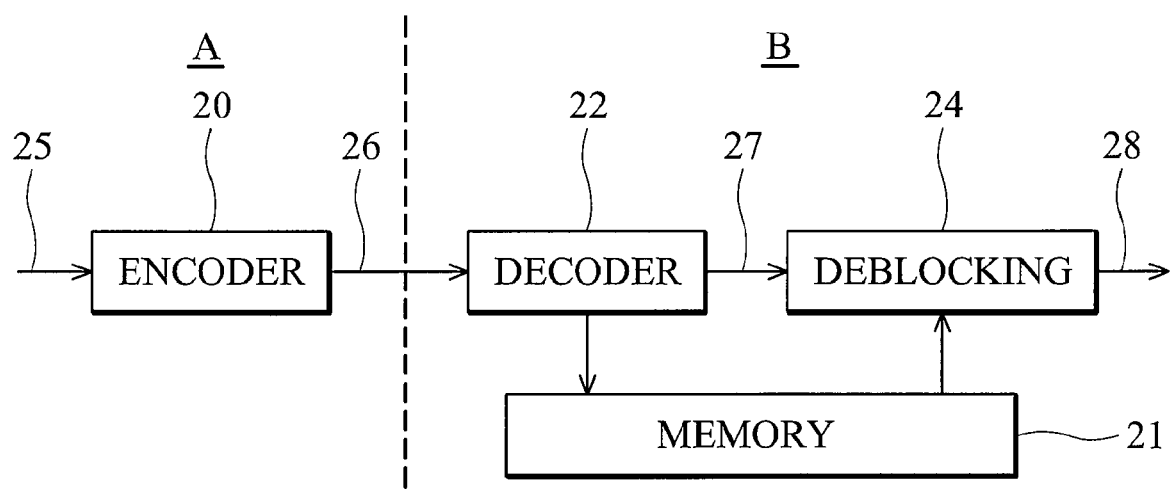
FIG. 2 is a schematic view of a multimedia processing device according to an embodiment of the invention.

FIG. 2 is a multimedia processing device comprising an encoder module 20, a decoder module 22, a deblocking module 24, and a memory device 21. Encoder module 20 located at site A receives data 25, performs data compression on data 25, and generates compressed data 26. Compressed data 26 can be transferred to decoder module 22 at site B or site A. It should be noted that site A and site B are at different locations. Then, compressed data 26 received by decoder module 22 can be decompressed into decompressed data 27. Decompressed data 27 is stored in memory device 21. Deblocking module 24 retrieves decompressed data 27 from memory device 21 and generates deblocked data 28.

Figure 3:
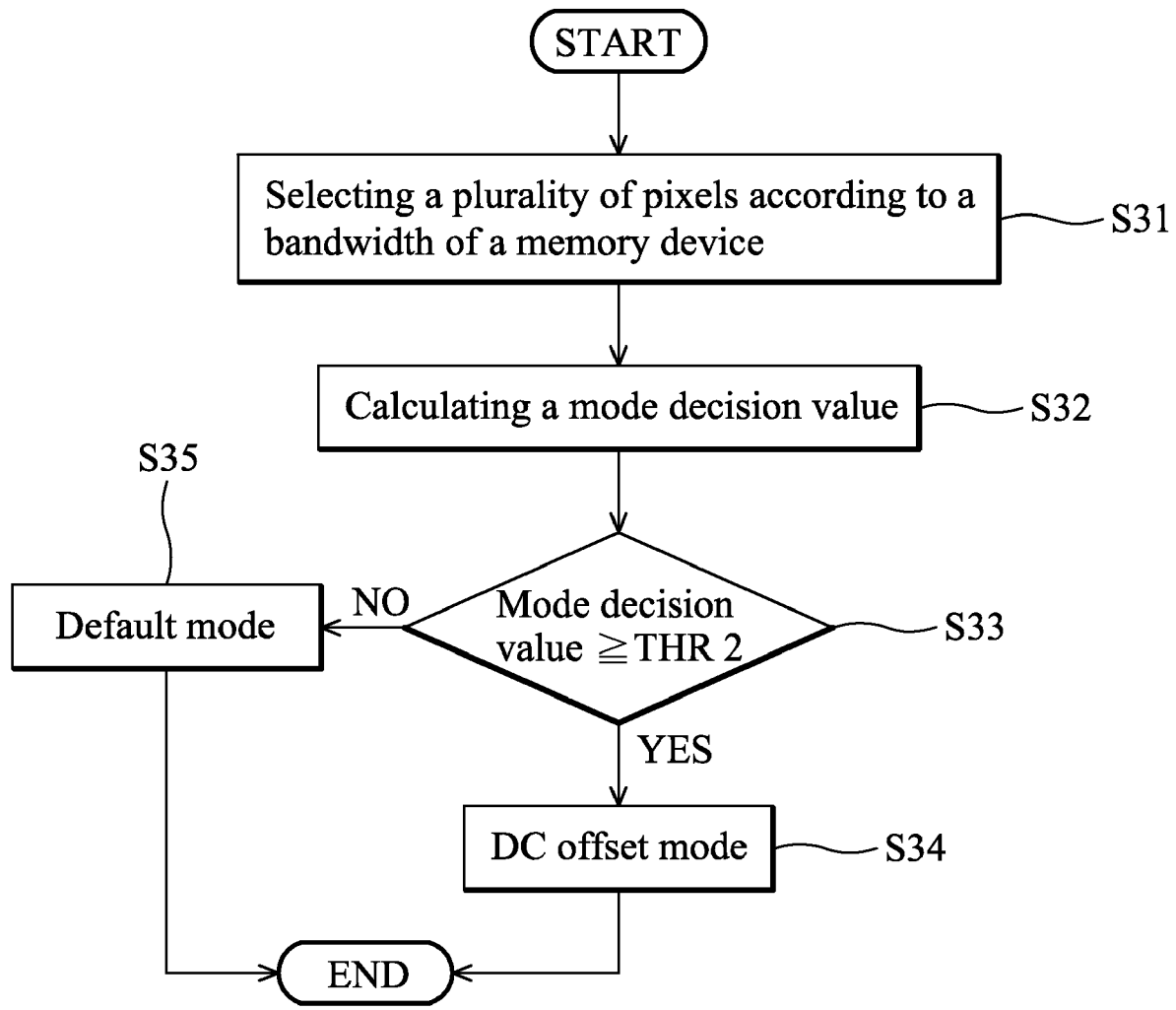
FIG. 3 is a flow chart of a method for removing blocking artifacts according to an embodiment of the invention.
Figure 4:
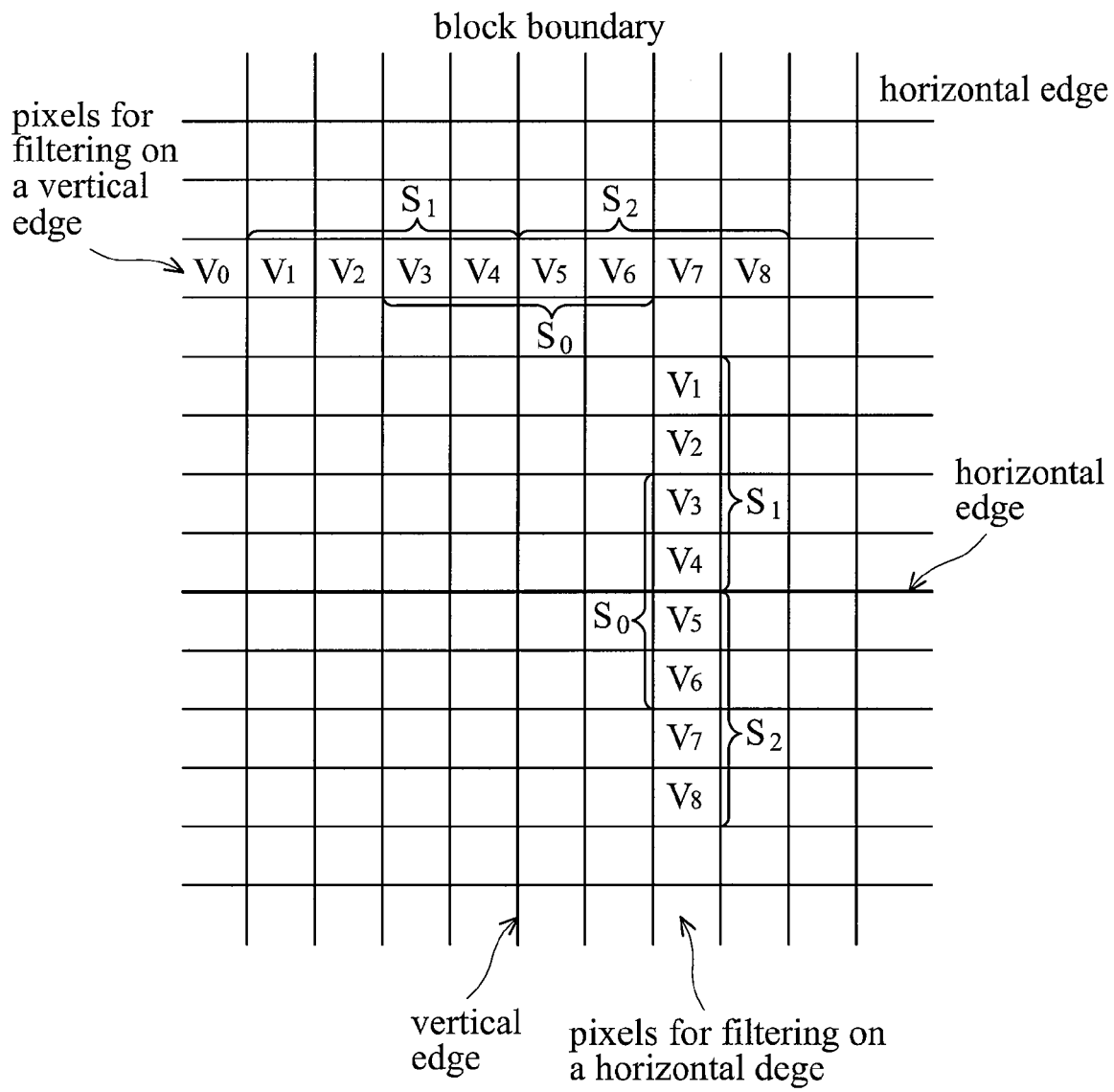
FIG. 4 is a schematic view of a pixel matrix illustrating block boundaries in horizontal and vertical directions according to an embodiment of the invention.

FIG. 3 is a deblocking operation performed in deblocking module 24. First, a plurality of pixels is selected from memory device 21 according to the bandwidth of memory device 21 (step S31). Note that the pixels selected are uniformly distributed at two sides of a block boundary, wherein the block boundary can be a vertical edge or a horizontal edge. In this embodiment, the bandwidth of memory device 21 is 32 bits bus/memory width and the number of first pixels is eight. The eight pixels are $v_1$, $v_2$, $v_3$, $v_4$, $v_5$, $v_6$, $v_7$, $v_8$, respectively, as shown in FIG. 4. Then, a mode decision value eq_cnt is calculated according to the difference of adjacent pixels (step S32). The equation to calculate the mode decision value eq_cnt is as follows:

$$eq\_cnt=\phi(v_1-v_2)+\phi(v_2-v_3)+\phi(v_3-v_4)+\phi(v_4-v_5)+\phi(v_5-v_6)+\phi(v_6-v_7)+\phi(v_7-v_8)$$

where $\phi(r)=1$, if $|r|\leq THR1$, otherwise $\phi(r)=0$, wherein THR1 is a first predetermined value defined by one skilled in the art. Mode decision value eq_cnt is compared with a second predetermined value THR2 to determine the computing mode for reducing blocking artifact (step S33), wherein the second predetermined value THR2 is also defined by one skilled in the art. The computing mode can be a default mode or a DC offset mode. The DC offset mode is selected when the mode decision value eq_cnt is greater than or equal to the second predetermined value THR2, otherwise the default mode is selected.

When the default mode is selected, the deblocking operation is performed by replacing the magnitude of the discontinuous component of pixel $v_4$ and $v_5$ of memory device 21 sandwiching the block boundary with $v_4'$ and $v_5'$, according to the following equation:

$$v_4'=v_4-d$$

$$v_5'=v_5+d$$

$$d=\text{CLIP}(c_2 \cdot (a_{3,0}'-a_{3,0})//c_3, (v_4-v_5)/2) * \delta(|a_{3,0}|<QP)$$

$$a_{3,0}'=\text{SIGN}(a_{3,0})*\text{MIN}(|a_{3,0}|,|a_{3,1}|,|a_{3,2}|))$$

$$a_{3,0}=([c_1 -c_2 c_2 -c_1]*[v_3 v_4 v_5 v_6]^T)//c_3$$

$$a_{3,1}=([c_1 -c_2 c_2 -c_1]*[v_1 v_2 v_3 v_4]^T)//c_3$$

$$a_{3,2}=([c_1 -c_2 c_2 -c_1]*[v_5 v_6 v_7 v_8]^T)//c_3$$

wherein QP is the quantization parameter of a macroblock to which pixel $v_5$ belongs, values $c_1$, $c_2$, $c_3$ are kernel constants used in 4-point DCT, and $a_{3,0}$, $a_{3,1}$, $a_{3,2}$ are the discontinuous component in each of the plurality of pixel sets (S0, S1, S2), respectively.

When the DC offset mode is selected, the equation to remove the blocking artifacts is as follows:

$$\max = \text{MAX}(v_1, v_2, v_3, v_4, v_5, v_6, v_7, v_8),$$

$$\min = \text{MIN}(v_1, v_2, v_3, v_4, v_5, v_6, v_7, v_8),$$

$$\text{if } |\max - \min| < 2 \cdot QP,$$

$$\text{then } v_n' = \sum_{k=-4}^{4} b_k \cdot p_{n+k}, 1 \leq n \leq 8$$

$$p_m = \begin{cases} (|v_2 - v_1| < QP)?v_1:v_2, & m < 1 \\ v_m, & 1 \leq m \leq 8 \\ (|v_7 - v_8| < QP)?v_8:v_7, & m > 8 \end{cases}$$

$$\{b_k: -4 \leq k \leq 4\} = \{1, 1, 2, 2, 4, 2, 2, 1, 1\} // 16$$

wherein the $v_1$-$v_8$ are boundary pixels, QP is the quantization parameter of a block adjacent the block boundary, and $v_n$ is an adjusted value. The equation $(|v2-v1|<QP)?v1:v2$ means $P_m=v1$ when $(|v2-v1|<QP)$, while $P_m=v2$ when $(|v2-v1|\geq QP)$. The equation $(|v7-v8|<QP)?v8:v7$ means $P_m=v8$ when $(|v7-v8|<QP)$, while $P_m=v7$ when $(|v7-v8|\geq QP)$. The deblocking operation is performed by replacing pixels $v_1$-$v_8$ of memory device 21 with $v_1'$-$v_8'$.

Note that, a deblocking operation is performed first along the horizontal edges and then along by the vertical edges. The blockiness artifact in an image or video frame will be removed after performing a deblocking operation in default mode or DC offset mode.

In addition, the mode decision value of the invention is calculated according to eight pixels around the block boundary, thus a 32 bit width is necessary for each deblocking operation. For present systems with 32 bit bus/memory width, one memory access is adequate for performing a deblocking operation, thus the bandwidth request is reduced by the invention. However, if the mode decision value of the invention is calculated according to ten pixels around the block boundary (defined by MPEG 4 standard), 40 bit width is necessary for each deblocking operation. For present systems with 32 bit bus/memory width, two memory accesses are required to perform a deblocking operation, thus increasing the required bandwidth, and wasting memory bandwidth since only 8 bits is required for the second memory access of each deblocking operation. Thus, the memory access efficiency of the deblocking method of the invention is better than the method of the MPEG 4 standard definition.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A deblocking method, for removing blocking artifacts, comprising: selecting a plurality of first pixels according to a bandwidth of a memory device, wherein the first pixels are uniformly distributed at two sides of a block boundary; calculating a first value according to the first pixels stored in the memory device; determining a computing mode according to the first value and a first predetermined value; generating a plurality of second pixels according to the following:

$$v'_n = \sum_{k=-4}^{4} b_k \cdot p_{n+k}, \ 1 \leq n \leq 8$$

$$p_m = \begin{cases} (|v_2 - v_1| < QP)?v_1:v_2, \ m < 1 \\ v_m, \ 1 \leq m \leq 8 \\ (|v_7 - v_8| < QP)?v_8:v_7, \ m > 8 \end{cases}$$

$$\{b_k: \ -4 \leq k \leq 4\} = \{1, 1, 2, 2, 4, 2, 2, 1, 1\}$$

wherein $v_n'$ are the second pixels, $v_m$ are the first pixels, QP is a second predetermined value; and replacing the first pixels stored in the memory device with the second pixels; wherein the first predetermined value is determined according to the first pixels which consist of precisely eight pixels.

2. The deblocking method as claimed in claim 1, wherein the plurality of second pixels are generated according to a DC offset mode, when the first value is greater than or equal to the first predetermined value.

3. A multimedia processing device, comprising: an encoder for encoding an input stream and outputting an encoded stream; an decoder for decoding the encoded stream and outputting decoded stream; and a deblocking unit for selecting a plurality of first pixels from the decoded stream according to a bandwidth of a memory device, and generating a plurality of second pixels for replacing the first pixels stored in the memory device to remove blocking artifacts, the plurality of second pixels being generated according to the following:

$$v'_n = \sum_{k=-4}^{4} b_k \cdot p_{n+k}, \ 1 \leq n \leq 8$$

$$p_m = \begin{cases} (|v_2 - v_1| < QP)?v_1:v_2, \ m < 1 \\ v_m, \ 1 \leq m \leq 8 \\ (|v_7 - v_8| < QP)?v_8:v_7, \ m > 8 \end{cases}$$

$$\{b_k: \ -4 \leq k \leq 4\} = \{1, 1, 2, 2, 4, 2, 2, 1, 1\}$$

wherein $v_n'$ are the second pixels, $v_m$ are the eight pixels, QP is a predetermined value;

wherein the computing mode is determined according to a first value and a first predetermined value; and the first pixels consist of precisely eight pixels.

4. The multimedia processing device as claimed in claim 3, wherein the plurality of second pixels are generated according to a DC offset mode, when the first value is larger than or equal to the first predetermined value.

* * * * *